United States Patent [19]

Larsen et al.

[11] Patent Number: 5,198,745

[45] Date of Patent: Mar. 30, 1993

[54] DYNAMIC BRAKING RESISTOR SYSTEM

[75] Inventors: Einar V. Larsen, Charlton; Ann T. Hill, Ballston Spa, both of N.Y.

[73] Assignee: Electric Power Research Institute, Palo Alto, Calif.

[21] Appl. No.: 742,881

[22] Filed: Aug. 8, 1991

[51] Int. Cl.[5] ............................................. H02K 11/00
[52] U.S. Cl. ..................................... 322/58; 323/233; 323/298; 323/369; 361/54
[58] Field of Search .............. 323/210, 233, 298, 369; 307/18, 19, 29; 322/58; 361/54

[56] References Cited

U.S. PATENT DOCUMENTS

| | | | |
|---|---|---|---|
| 3,648,212 | 3/1972 | Kuwabara et al. | 338/53 |
| 3,657,607 | 4/1972 | Knauer | 361/58 |
| 3,660,723 | 5/1972 | Lutz et al. | 361/58 |
| 3,991,352 | 11/1976 | Fry et al. | 318/380 |
| 4,001,672 | 1/1977 | Postolaty et al. | 323/208 |
| 4,173,732 | 11/1979 | Anderson | 318/380 |
| 4,292,545 | 9/1981 | Hingorani | 323/210 |
| 4,352,049 | 9/1982 | Franz | 318/376 |
| 4,434,376 | 2/1984 | Hingorani | 323/210 |
| 4,904,918 | 2/1990 | Bailey et al. | 318/759 |
| 4,916,428 | 4/1990 | Burke | 338/62 |
| 4,999,565 | 3/1991 | Nilsson | 323/210 |

OTHER PUBLICATIONS

Kimbark, E. W., "Improvement of Power System Stability by Changes in the Network," *IEEE Transactions on Power Apparatus and Systems,* vol. PAS-88, No. 5 (May 1969).

Shelton, M. L., et al., "Bonneville Power Administration 1400-MW Braking Resistor," *IEEE PES Summer Meeting & Energy Resources Conference,* (Jul. 1974).

Chee-Hing, D. J., et al., "A New Static Watt Compensator for the Iron & Steel Company of Trinidad and Tobago," *IEEE Transactions on Power Apparatus and Systems,* vol. PAS-101, No. 8 (Aug. 1982).

*Primary Examiner*—Steven L. Stephan
*Assistant Examiner*—J. Sterrett
*Attorney, Agent, or Firm*—Klaarquist, Sparkman, Campbell, Leigh & Whinston

[57] ABSTRACT

A dynamic braking system resistor for stabilizing a power system during power system disturbances includes a braking resistor for coupling with a power system bus. A controller monitors a power system parameter, such as the speed of a generator coupled with the power system bus, and determine therefrom a thyristor control signal. The controller uses the power system parameter to establish a desired modulation and then provides a bias to the desired modulation. The controller conditions the biased desired modulation signal to provide the thyristor control signal. A thyristor valve responsive to the thyristor control signal couples the braking resistor with a ground potential. A method is also provided of damping subsequent oscillations on a power system following a power system disturbance using the dynamic braking resistor.

35 Claims, 2 Drawing Sheets

DYNAMIC BRAKING RESISTOR SYSTEM

BACKGROUND OF THE INVENTION

The present invention relates generally to braking resistors used in power systems during power system disturbances, and more particularly to a new dynamic braking resistor and a method of damping subsequent oscillations on a power system following a power system disturbance using the dynamic braking resistor.

In the past, braking impedances, typically referred to as "braking resistors," have been applied to a few power systems, such as in remote generation locations. A typical braking resistor provides a shunt resistance path to ground when coupled with the power system by switching during a power system disturbance. Such power system disturbances may be caused by a downed power line, a short circuit on a transmission line, a lightening storm, or other undesirable events. These conventional braking resistors have a mechanical switch which couples the resistor to the power system for a predetermined time following the detection of a major system disturbance.

After this predetermined time, the conventional braking resistors are abruptly removed from the line by opening the mechanical switch. After removal from the line, these conventional braking resistors cannot be switched back into the line until they have cooled down sufficiently, which requires from ten minutes up to several hours. Thus, conventional braking resistors are incapable of providing any damping for the subsequent oscillations of the power system which follow the disturbance and the insertion of the braking resistor. Furthermore, the fixed resistance or conductance nature of a conventional braking resistor lacks flexibility and imposes an additional loss burden on the power system during the time it is coupled therewith if less than the total dissipation is required to respond to the disturbance.

Thus a need exists for a dynamic braking resistor, and a method of damping subsequent oscillations on a power system following a power system disturbance, which is directed toward overcoming, and not susceptible to, the above limitations and disadvantages.

SUMMARY OF THE INVENTION

According to one aspect of the present invention, a dynamic braking resistor is provided for stabilizing a power system during power system disturbances. The dynamic braking resistor includes a controller monitoring a power system parameter and determining in response thereto a conductance control signal. A variable braking resistor is provided for coupling with the power system. The conductance of the braking resistance is variable in response to the conductance control signal so as to brake and damp a power system disturbance.

In an illustrated embodiment, the controller includes a desired modulation establishing device which establishes a desired modulation signal for modulating the braking resistor in response to the monitored power system parameter. The controller also includes a biasing stage for biasing the desired modulation signal, with the biasing stage including a first deadband filter. The controller also has a limiter for limiting the biased desired modulation signal to provide the conductance control signal, with the limiter having a second deadband filter. The first and second filters provide a substantially zero conductance control signal during minor steady-state system disturbances. Thus, the dynamic braking resistor imposes minimal losses on the power system during steady-state conditions.

According to several other illustrated embodiments, where the braking resistor is coupled with the power system at a first power system line, one or a combination of several different items may be the power system parameter monitored by the controller. For example, the controller may monitor the power flow, the frequency, or the magnitude of the line current flowing through this first power system line. Additionally, the controller may monitor a power system parameter comprising a speed at which a generator coupled with the power system is running.

In another illustrated embodiment, the controller has a system parameter synthesizer which monitors local power system parameters which are local to a first point at which the braking resistor is coupled with the power system. The synthesizer uses the monitored local power system parameters to synthesize remote power system parameters at a second point remote from the first point. The controller then determines the control signal in response to the synthesized remote power system parameters.

According to another aspect of the present invention, a dynamic braking resistor for stabilizing a power system during disturbances includes a braking resistor for coupling with a bus on the power system. The dynamic braking resistor also has a controller to monitor a power system parameter and to determine therefrom a thyristor control signal. A thyristor control valve is coupled with the braking resistor. The thyristor control valve is responsive to the thyristor control signal to vary the conductance of the braking resistor so as to brake and damp a power system disturbance.

According to a further aspect of the present invention, a method is provided of damping subsequent oscillations on a power system following a power system disturbance. The method includes the step of providing a variable conductance braking resistor coupled with the power system, with the conductance of the braking resistor being variable in response to a conductance control signal. In a monitoring step, a power system parameter is monitored to detect an occurrence of a power system disturbance. In a determining step, the conductance control signal is determined in response to the monitor power system parameter so as to dampen the subsequent power system oscillations following the detection of the occurrence of a power system disturbance. In a varying step, the conductance of the braking resistance is varied with the conductance control signal to dampen the subsequent power system oscillations.

In an illustrated embodiment, the determining step comprises establishing a desired modulation signal to modulate the braking resistor conductance in response to the monitored power system parameter. The determining step also includes a biasing step where the desired modulation signal is biased. In a limiting step, the biased desired modulation signal is limited to a value under a maximum conductance limit. In a further illustrated embodiment, the biasing step comprises using a first time constant when the desired modulation signal is rising, and applying a second time constant when the desired modulation signal is falling.

In another illustrated embodiment, the determining step comprises determining a desired modulation signal from the power system parameter with a linear transfer function. The determining step also includes providing a bias to the desired modulation signal with a peak detection function. The determining step also has a limiting step, where the biased desired modulation signal is limited to a value between a maximum conductance and a lower deadband limit with a limiting function, to thereby provide the conductance control signal.

An overall object of the present invention is to provide an improved dynamic braking resistor for stabilizing a power system during power system disturbances.

It is a further overall object of the present invention to provide an improved method of damping subsequent oscillations on a power system following a power system disturbance.

Another object of the present invention is to provide a dynamic braking resistor which dampens the subsequent oscillations on a power system following a power system disturbance.

An additional object of the present invention is to provide an improved dynamic braking resistor for coupling with a power system which imposes minimal steady-state losses on the power system.

Still another object of the present invention is to provide a thyristor-controlled braking resistor assembly.

A further object of the present invention is to provide a method of damping subsequent oscillations on a power system following a power system disturbance which minimizes the steady-state losses incurred.

Yet another object of the present invention is to provide a dynamic braking resistor which aids power system security for all contingencies, without imposing excessive duty on mechanical switches or incurring excess energy loss.

Another object of the present invention is to provide a method of controlling a dynamic braking resistor to automatically respond with the correct conductance required to deal with each disturbance on a power system.

The present invention relates to the above features and objects individually as well as collectively. These and other objects, features and advantages of the present invention will become apparent to those skilled in the art from the following description and drawings.

DETAILED DESCRIPTION OF A PREFERRED EMBODIMENT

Figure 1:
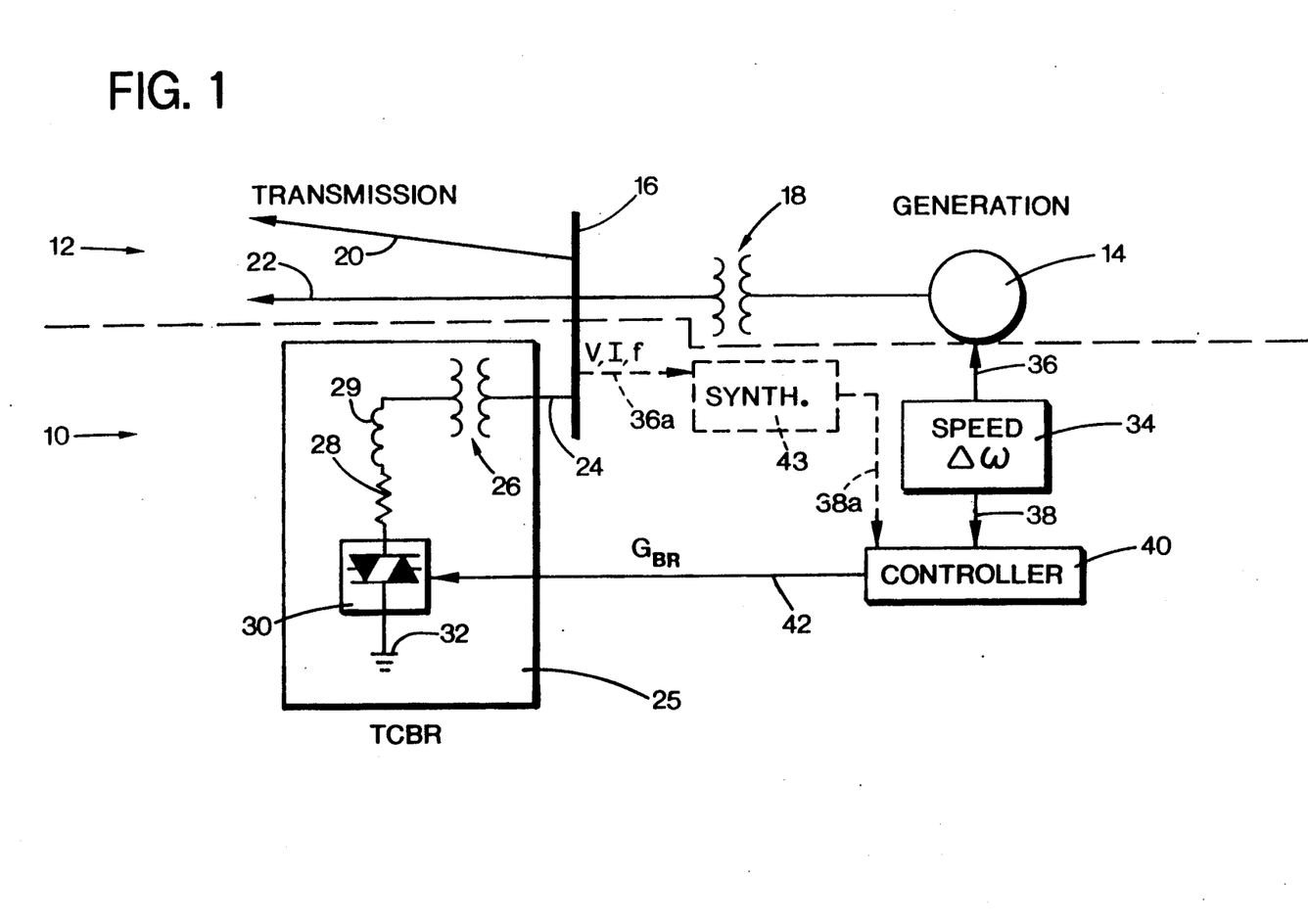
FIG. 1 is a single-line schematic block diagram of a power generation and transmission system having one form of a dynamic braking resistor of the present invention coupled therewith.

FIG. 1 illustrates an embodiment of a dynamic braking apparatus 10 constructed in accordance with the present invention, for braking and damping disturbances on a power system 12 to which the dynamic braking apparatus 10 is coupled. The power system 12 includes a generator 14 which supplies electrical power to a power system bus 16 through a transformer 18, which is typically a step-up transformer. Power is transmitted from the bus 16 through a plurality of transmission lines, such as lines 20 and 22, to the remainder of the power system grid. A conductor 24 couples a variable conductance braking resistor assembly, such as a thyristor-controlled braking resistor assembly 25, of the dynamic braking apparatus 10 with the power system bus 16.

The braking resistor assembly 25 may optionally include a transformer 26 which couples conductor 24 with a braking resistor 28. In some applications it will be economically advantageous to use the optional coupling transformer 26, whereas in other applications, the transformer 26 may be omitted. The influence of the braking resistor 28 on the power system 12 may be described in terms of ohmic resistance, and alternatively in terms of conductance (G) in mhos (the reciprocal of the resistance (R) in ohms).

Although the braking resistor 28 is illustrated in FIG. 1 as a single discrete component, the braking resistor may also comprise a plurality of resistors which may be arranged, for example, as a resistor bank. In some embodiments, it may be particularly advantageous, for reasons described further below, for the braking resistor 28 to have a small inductive component 29, illustrated schematically in FIG. 1. For example, a suitable braking resistor 28 may be constructed as a coil of stainless steel wire, with the coil configuration contributing the inductive component 29 to the braking resistor 28.

The braking resistor assembly 25 also includes a variably controllable switching device, such as a thyristor valve 30, which may be controlled to control the amount of current passing through the resistor 28, that is, to control the conductivity of resistor 28. The illustrated thyristor valve 30 is a bi-directional valve containing a plurality of anti-parallel switching devices, such as thyristors. The thyristor valve 30 may be constructed of a plurality of discrete thyristors, which may be conventional thyristors, gate-turn-off thyristors (GTOs), MOS-controlled thyristors (metal-oxide-silicon), and the like or equivalents and combinations thereof. The inductive component 29 of resistor 28 advantageously slows the rate of rise of a current waveform through the thyristors within the valve 30, which is a preferred manner of operating some thyristors.

The thyristor valve 30 couples the braking resistor 28 to a neutral ground potential 32. Thus, the braking resistor assembly 25 is coupled in shunt with the power system transmission grid. In a three phase braking resistor assembly (not shown), each phase may have a braking resistor 28 in series with a thyristor valve 30, and the three resistor/valve phases may be arranged in a delta or a wye configuration, with the wye neutral tie corresponding to the ground potential 32 in FIG. 1.

To control the thyristor valve 30, a power system parameter indicative of a power system disturbance is measured and used to establish a desired modulation for the dynamic braking apparatus 10. In the illustrated embodiment, the power system parameter is the angular speed $\omega$ of the local generation, that is, the speed of generator 14. The generator speed may be monitored by a conventional transducer, illustrated in FIG. 1 as a speed sensor 34, schematically illustrated as monitoring the generator speed by arrow 36. The speed sensor 34 may be of the type to provide a $\Delta\omega$ or generator speed deviation signal 38. A controller 40 receives and processes the $\Delta\omega$ signal 38 to provide a conductance control signal, such as a thyristor control signal or $G_{BR}$ signal 42, as described further below.

The thyristor valve 30 receives the thyristor control signal 42 from controller 40, and in response thereto fires selected discrete thyristors within the valve to provide a desired modulation and conductance through the braking resistor 28. For example, using the illustrated bi-directional switches in the thyristor valve 30, the switches may be delayed in turning on (entering a conducting state) beyond the zero crossing of the sinusoidal current waveform. For instance, delaying the firing of the thyristors within valve 30 for 90° beyond a zero crossing would result in the braking resistor 28 conducting for only half of a period. Thus, the thyristor valve 30 varies the conductance of the braking resistor assembly 25 by controlling the current flowing through the braking resistor 28 in response to the $G_{BR}$ conductance control signal 42.

In an alternative embodiment, the power system parameter may be monitored along a transmission line of the power system, or at a power system bus, such as bus 16, which is local with respect to the braking resistor assembly 25. This alternate monitoring is illustrated in FIG. 1 in dashed lines as a synthesizer ("SYNTH.") 43 monitoring various system parameters at bus 16 and providing a system parameter deviation signal 38a. These system parameters may include the power flow, the frequency, the voltage or the magnitude of the line current at the point monitored at 36a. Alternatively, the synthesizer 43 may monitor the local system parameters at bus 16 and synthesize therefrom remote power system parameters, such as those corresponding to the generator 14 or another power system location (not shown) remote from bus 16. As mentioned above with respect to the speed sensor 34, the synthesizer 43 may be a separate discrete component as illustrated, or incorporated as a portion of the controller 40.

Figure 2:
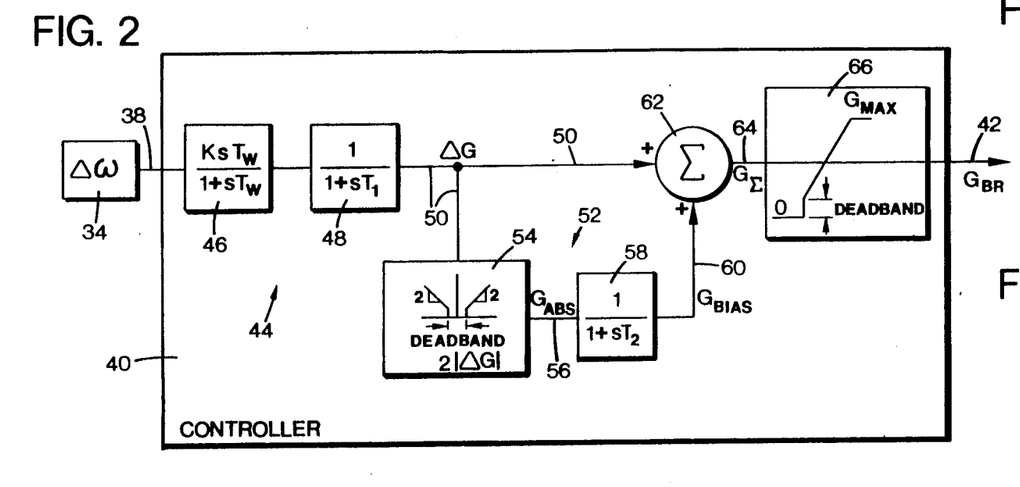
FIG. 2 is a block diagram of one form of a controller of FIG. 1.

Referring now to FIG. 2, the operation of controller 40 is shown in detail. While in the illustrated embodiment, the speed sensor 34 provides the $\Delta\omega$ speed deviation signal 38 to the controller 40, it is apparent that the controller 40 may include a signal processing stage (not shown) to convert a raw speed signal received from a speed sensor into the $\Delta\omega$ speed deviation signal 38.

Figure 3A:
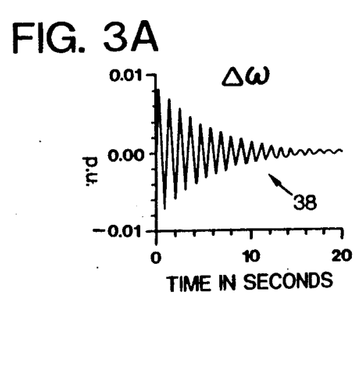
FIGS. 3A-3E are graphs of the per unit fluctuations associated with the controller of FIG. 2 during the first twenty seconds following a power system disturbance.

A typical generator speed deviation signal 38 which occurs during a system disturbance is shown in FIG. 3A for a twenty second time period beyond the initiation of the system disturbance. The controller 40 has a desired modulation establishing device or modulator, such as a linear transfer function stage 44 comprising first and second transfer function processors 46 and 48 which perform the Laplace transform functions as shown in FIG. 2. In an illustrated embodiment, for a generating station having several units with a total rating of 2,500 MW, coupled with a 500 kV bus 16 and transmission lines 20, 22, the following values may be substituted for the variables shown in the transfer function processors 46 and 48:

$K = 6$
$T_w = 3$ seconds
$T_1 = 0.1$ seconds

Figure 3B:
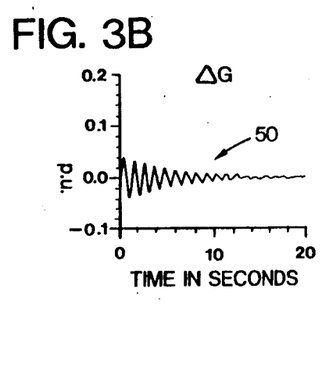

The linear transfer function stage 44 operates on the $\Delta\omega$ speed deviation signal 38 to provide a desired modulation signal or $\Delta G$ signal 50. Given the generator speed deviation signal 38 of FIG. 3A, and the values for the linear transfer function stage 44 listed above, the $\Delta G$ modulation signal 50 provided thereby is illustrated in FIG. 3B for a twenty second time period beyond the initiation of the system disturbance.

Figure 3C:
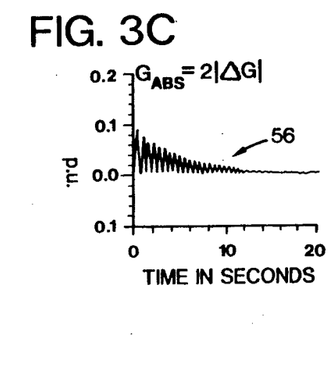

The controller 40 also includes a bias establishing device, such as a biasing stage 52. The biasing stage 52 has a signal conditioner, such as a twice-the-absolute-value processor 54, which receives and conditions the modulation signal 50. The processor 54 includes a deadband filter (not shown, but illustrated schematically in its affect as "DEADBAND" in processor 54) for a small amplitude to each side of the zero amplitude level. The deadband range may be set to correspond to minor steady-state power system disturbances, which do not require corrective conductance of the braking apparatus 10. Beyond this deadband region, the processor 54 doubles the absolute value of the $\Delta G$ desired modulation signal 50 to provide an absolute value conductance signal or $G_{ABS}$ signal 56. Thus, the $G_{ABS}$ signal 56 represents twice the absolute value of the modulation signal 50 for a desired modulation signal having an amplitude greater than that established by the deadband filter of processor 54. For the illustrated embodiment, the absolute value conductance signal 56 is shown in FIG. 3C for the first twenty seconds following the initiation following the disturbance.

Figure 3D:
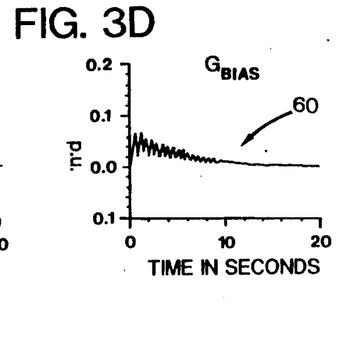

The biasing stage 52 also includes a low pass filter 58 which receives and filters the absolute value conductance signal 56 from processor 54 to provide a conductance bias signal or $G_{BIAS}$ signal 60. The low pass filter 58 performs the Laplace transform shown in FIG. 2 on the $G_{ABS}$ signal 56, with $T_2$ set equal to 0.1 seconds, to provide the conductance bias signal shown in FIG. 3D for the illustrated embodiment. The time constant $T_2$ provided by the low pass filter 58 is long with respect to the period of the expected oscillations of the $\Delta G$ desired modulation signal 50.

Figure 3E:
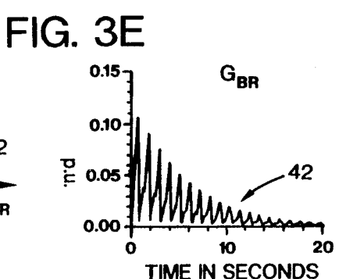
Figure 3F:
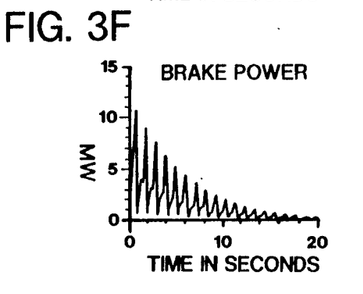
FIG. 3F is a graph of the brake power in megawatts over the same time duration.

The controller 40 also includes a summation device or summer 62 which receives and adds together the modulation signal 50 and the conductance bias signal 60 to provide a biased modulation signal or a conductance summation signal, or simply, a $G_\Sigma$ signal 64. Thus, the $G_\Sigma$ signal 64 is the sum of the $\Delta G$ signal 50 of FIG. 3B and the $G_{BIAS}$ signal of FIG. 3D. The controller 40 also includes an output signal conditioning device, such as a limiter 66. The limiter 66 confines the $G_\Sigma$ conductance summation signal 64 to a value between a deadband region and a maximum conduction limit or $G_{MAX}$ limit shown in FIG. 2. The limiter 66 also includes a deadband filter (not shown, but illustrated schematically in its affect as "DEADBAND" in limiter 66) which provides a deadband region above the zero conductance level. The output of limiter 66 is the $G_{BR}$ thyristor control signal 42, which is also shown in FIG. 3E. In the illustrated example, the brake power in megawatts supplied by the dynamic braking apparatus 10 during the first twenty seconds following the initiation of a system disturbance is illustrated in FIG. 3F.

A preferred steady-state operating condition for the dynamic braking apparatus 10 is zero conductance until the deviation signal 38, as modulated by stage 44 and with the $G_{BIAS}$ signal 60 applied thereto, exceeds the deadband in limiter 66. The level of the limiter 66 deadband is dependent upon the needs of the particular power system 12 to which the dynamic braking apparatus 10 is coupled. That is, a power system is continually undergoing minor system fluctuations during steady-state conditions during which braking action on the part of the dynamic braking apparatus 10 is not usually desired. The deadband of limiter 66 may be set so no correction is applied by the braking apparatus 10 during minor steady-state type system fluctuations. However, during a power system disturbance, the power system 12 typically swings over a range of 0.2–2.0 Hz in an oscillatory response to the disturbance. The conductance of the braking resistor 28 is varied by the thyristor valve 30 to stabilize the power system according to the conductance control signal 42. The desired resting point for the deviation signal 38 is, of course, zero at steady-state, thus, the desired modulation signal 50 has a zero average value as shown in FIG. 3B.

Since the braking resistor 28 is only capable of consuming power, operation of the braking resistor assembly 25 must follow the oscillatory swings of the power system, hence the need for a power system parameter input, such as the speed deviation signal 38 (see FIG. 3A). Because the resistance of the braking resistor 28 cannot become a negative value (cannot supply power), the resistor conductance is biased in a positive direction using the biasing stage 52 such that the conductance control signal 42 remains positive when the modulation signal 50 swings negatively (see FIG. 3B).

To dampen the oscillatory swings of the power system 12, the oscillations of the correcting waveform supplied by the dynamic braking apparatus 10 are the important consideration, rather than the location of the average value. Thus, to provide a proper response to the power system oscillations, there are several options. For example, first, the conductance control signal 42 could always be a positive value, forcing current through the braking resistor 28 at all times. However, this is not a desirable option because it would imposed unnecessary steady-state losses on the power system 12. Rather, it is desirable to have the conductance of the braking apparatus 10 fall to zero during steady-state conditions. There are several ways in which this desired response could be implemented.

First, it would be possible to sense a transient condition on the power system 12 and add a bias at that time. Second, the $G_{BIAS}$ conductance bias signal 60 could be switched to a constant level during the transient period and then switched to zero thereafter. Third, only the required $G_{BIAS}$ conductance signal 60 could be applied by the controller 40 to allow full modulation at the desired modulation signal 50 to be implemented without asking for the impossible condition of a negative conductance from the braking resistor 28. In summary, the key points are first, it is not possible to supply a negative conductance using the braking resistor 28; second, zero conductance is desired during steady-state conditions; and thirdly, it is desirable to respond to the oscillatory nature of the power system parameter deviation signal.

In operation, a power system disturbance is detected by monitoring a power system parameter, such as the speed of generator 14 using speed sensor 34. The speed sensor 34 provides the $\Delta\omega$ speed deviation signal 38 to controller 40. The speed deviation signal (see FIG. 3A) is processed through the linear transfer function stage 44 to provide the $\Delta G$ desired modulation signal 50 (see FIG. 3B). In this manner, a sufficient bias is maintained by the controller 40 for the damping action of the dynamic braking apparatus 10 to be effective during the decay of the system oscillations as shown in FIG. 3A. The deadband filter of the biasing stage processor 54 and the deadband filter of the output limiter 66 are set so that during steady-state conditions of the power system, the losses through the braking resistor 28 are substantially zero. That is, at zero conductance, the braking resistor, although permanently coupled with the system, appears as an open circuit.

In a particularly preferred embodiment, the low pass filter 58 may provide a peak detecting function which would have a different value for the time constant $T_2$ when the $G_{ABS}$ signal 56 is rising, and a second value for $T_2$ when the $G_{ABS}$ signal 56 is falling, that is on an instantaneous basis for each cycle. For example, in the illustrated example $T_2$ may be equal to 0.01 seconds for a rising waveform, and $T_2$ may be equal to 0.1 seconds for a falling waveform.

With the control system described above, the dynamic braking apparatus 10 automatically responds with the correct amount of resistance for the braking resistor 28, as described above, to deal with each detected disturbance on the power system 12. This is particularly advantageous and a large improvement over the earlier existing state of the art braking resistors, where a large resistor is simply switched into conductance with the power system for a predetermined time based upon some discrete event upon the power grid.

Thus, the dynamic braking apparatus 10 aids in power-system security for all contingencies, including major system disturbances and minor disturbances occurring during steady-state conditions, without concern for imposing excessive duty on mechanical switches as in the prior art, or imposing excessive losses on the power system 12 by the use of a fixed resistor. That is, the variable conductance of the dynamic braking resistor not only controls and dampens the effects of a system disturbance, but it only applies the amount of resistance needed to accomplish this damping, and no more. Since only the minimum resistance required for stabilizing the power system 12 is applied, the heating drawback of previous braking resistors, which required extended cooling periods (as discussed in the background section above), is advantageously minimized by the dynamic braking apparatus 10.

The operation of the illustrated dynamic braking apparatus 10 will be described with respect to an illustrated embodiment of a method of damping subsequent oscillations on a power system following a power system disturbance, as well as a method of controlling a dynamic braking resistor. The damping method includes the step of providing the variable conductance dynamic braking resistor assembly 25 having the braking resistor 28 coupled with the power system 12 and the thyristor valve 30. In a monitoring step, a power system parameter is monitored to detect an occurrence of a power system disturbance.

This monitoring step may be accomplished in several different manners. For example, the speed sensor 34 may detect the speed deviation signal 38 of the speed of generator 14. Alternatively, the synthesizer 39 may monitor and synthesize various local system parameters to determine therefrom remote power system parameters corresponding to another point on the power system remote from the bus 16. Alternatively, the synthesizer 39 could be provided for determining a power system parameter signal for supply to the controller 40 from the power flow, frequency, or magnitude of the line current flowing through the power system at bus 16.

In a determining step, the conductance or thyristor control signal 42 is determined in response to the monitored power system parameter so as to dampen the subsequent power system oscillations following the detection of the occurrence of a power system disturbance. This determining step may be accomplished using the illustrated controller 40. The $\Delta G$ desired modulation signal 50 is determined or established in the illustrated embodiment from the Δω speed deviation signal 38 using a linear transfer function applied by stage 44 comprising the first and second processors 46 and 48.

In a biasing portion of the determining step applied by stage 52, the desired modulation signal passes through processor 54 or conditioner to provide the $G_{ABS}$ absolute value conductance signal 56. In a biasing step, a bias is provided to the ΔG modulation signal 50 with a peak detection function applied by the low pass filter 58. Processor 54 includes a deadband region, corresponding to the steady-state ordinary minor system disturbances which do not require any corrective action on the part of the dynamic braking apparatus 10. Thus, for values of the desired modulation signal 50 falling within the deadband of processor 54, the conductance control signal 42 controls the thyristor valve 30 so the braking resistor 28 has a substantially zero conductance. The low pass filter 58 may bias the $G_{ABS}$ absolute value conductance signal 56 with a single $T_2$ time constant bias value. Alternatively, the low pass filter 58 may function as a peak detector to provide a first time constant value bias when the $G_{ABS}$ signal 56 is rising, and a second time constant bias when the $G_{ABS}$ signal 56 is falling.

The summation unit 62 of controller 40 then biases the ΔG modulation signal 50 by adding the $G_{BIAS}$ conductance bias signal 60 with it to provide the $G_\Sigma$ biased desired modulation signal 64. In a final portion of the determining step, the limiter 66 of controller 40 limits the $G_\Sigma$ signal 64 between the $G_{MAX}$ maximum conduction limit and a lower deadband limit. When the $G_\Sigma$ signal 64 falls within the deadband region of limiter 66, the conductance control signal 42 controls the thyristor valve 30 to provide a substantially zero conductance through the braking resistor 28. The deadband region of limiter 66 is set to cover a range of $G_\Sigma$ signal 64 which corresponds to minor steady-state system disturbances which do not require corrective action by the dynamic braking apparatus 10.

Having illustrated and described the principles of our invention with respect to a preferred embodiment, it should be apparent to those skilled in the art that our invention may be modified in arrangement and detail without departing from such principles. For example, other types of speed sensors, controllers and thyristor valve components may be used, as well as various resistor bank assemblies. We claim all such modifications falling within the scope and spirit of the following claims.

We claim:

1. A dynamic braking apparatus for stabilizing a power system during power system disturbances, comprising:
   a controller for monitoring a power system parameter to determine a frequency deviation signal of the monitored parameter indicative of a power system disturbance and producing in response a conductance control signal; and
   a variable conductance braking resistor assembly for coupling with said power system, the amplitude of the conductance of the braking resistor assembly responsive to the conductance control signal to brake and damp a power system disturbance.

2. A dynamic braking apparatus for stabilizing a power system during power system disturbances, comprising:
   a controller for monitoring a power system parameter indicative of a power system disturbance and producing in response a conductance control signal; and
   a variable conductance braking resistor assembly for coupling with said power system, the conductance of the braking resistor assembly responsive to the conductance control signal to brake and damp a power system disturbance;
   wherein the controller includes:
      a modulator for modulating the conductance of the braking resistor assembly in response to the monitored power system parameter, with the modulator providing a modulation signal; and
      a biasing stage for biasing the modulation signal to provide a biased modulation signal.

3. A dynamic braking apparatus for stabilizing a power system during power system disturbances, comprising:
   a controller for monitoring a power system parameter indicative of a power system disturbance and producing in response a conductance control signal; and
   a variable conductance braking resistor assembly for coupling with said power system, the conductance of the braking resistor assembly responsive to the conductance control signal to brake and damp a power system disturbance;
   wherein the controller includes:
      a modulator for modulating the conductance of the braking resistor assembly in response to the monitored power system parameter, with the modulator providing a modulation signal;
      a biasing stage for biasing the modulation signal to provide a biased modulation signal, with the biasing stage including a first deadband filter; and
      a limiter for limiting the biased modulation signal to provide the conductance control signal, the limiter having a second deadband filter, with the first and second filters providing a substantially zero conductance control signal during minor steady-state system disturbances to minimize the losses imposed by the dynamic braking apparatus on the power system during steady-state conditions.

4. A dynamic braking apparatus for stabilizing a power system during power system disturbances, comprising:
   a controller for monitoring a power system parameter indicative of a power system disturbance and producing in response a conductance control signal, wherein the controller determines the conductance control signal from the power system parameter using a linear transfer function, a peak detecting function and a limiting function; and
   a variable conductance braking resistor assembly for coupling with said power system, the conductance of the braking resistor assembly responsive to the conductance control signal to brake and damp a power system disturbance.

5. A dynamic braking apparatus according to claim 4 wherein the linear transfer function determines a modulation signal from the power system parameter, the peak detecting function biases the modulation signal, and the limiting function limits the biased modulation signal to a value between a maximum conductance and a lower deadband limit to provide the conductance control signal.

6. A dynamic braking apparatus for stabilizing a power system during power system disturbances, comprising:
a controller for monitoring a power system parameter indicative of a power system disturbance and producing in response a conductance control signal, wherein the controller includes a system disturbance magnitude deadband, with major system disturbances falling outside the deadband and minor system disturbances falling within the deadband, with the controller responding to major system disturbances by determining a conducting conductance control signal, and the controller responding to minor system disturbances by determining a substantially zero conductance control signal; and
a variable conductance braking resistor assembly for coupling with said power system, the conductance of the braking resistor assembly responsive to the conductance control signal to brake and damp a power system disturbance, wherein the braking resistor assembly conducts in response to the conducting conductance control signal during major system disturbances, and the braking resistor assembly maintains a non-conducting state in response to the substantially zero conductance control signal during minor system disturbances.

7. A dynamic braking apparatus according to claim 1 wherein the braking resistor assembly includes:
a braking resistor;
a thyristor valve coupled with the braking resistor; and
an inductive component coupled with the braking resistor to slow a rate of rise of a current waveform through the thyristor valve.

8. A dynamic braking apparatus according to claim 1 wherein the braking resistor assembly includes a coupling transformer for coupling the braking resistor assembly with said power system bus.

9. A dynamic braking apparatus for stabilizing a power system having a generator coupled with the power system during power system disturbances, comprising:
a controller for monitoring a power system parameter indicative of a power system disturbance and producing in response a conductance control signal, wherein the power system parameter monitored by the controller comprises a speed at which said generator is running; and
a variable conductance braking resistor assembly for coupling with said power system, the conductance of the braking resistor assembly responsive to the conductance control signal to brake and damp a power system disturbance.

10. A dynamic braking apparatus according to claim 9 wherein the controller provides a conductance control signal which increases the conductance of the braking resistor assembly in response to an increase in the generator speed, and which decreases the conductance of the braking resistor assembly in response to a decrease in the generator speed.

11. A dynamic braking apparatus according to claim 1 wherein the power system parameter monitored by the controller comprises a power flow on a power system line at which the braking resistor assembly is coupled with the power system.

12. A dynamic braking apparatus for stabilizing a power system during power system disturbances, comprising:
a controller for monitoring a power system parameter indicative of a power system disturbance and producing in response a conductance control signal; and
a variable conductance braking resistor assembly for coupling with said power system, the conductance of the braking resistor assembly responsive to the conductance control signal to brake and damp a power system disturbance;
wherein the power system parameter monitored by the controller comprises a frequency at a local power system bus to which the braking resistor assembly is coupled with the power system.

13. A dynamic braking apparatus for stabilizing a power system during power system disturbances, comprising:
a controller for monitoring a power system parameter indicative of a power system disturbance and producing in response a conductance control signal; and
a variable conductance braking resistor assembly for coupling with said power system, the conductance of the braking resistor assembly responsive to the conductance control signal to brake and damp a power system disturbance;
wherein the power system parameter monitored by the controller comprises a magnitude of a line current flowing through a power system line at which the braking resistor assembly is coupled with the power system.

14. A dynamic braking apparatus for stabilizing a power system during power system disturbances, comprising:
a controller for monitoring a power system parameter indicative of a power system disturbance and producing in response a conductance control signal; and
a variable conductance braking resistor assembly for coupling with said power system, the conductance of the braking resistor assembly responsive to the conductance control signal to brake and damp a power system disturbance;
wherein the controller includes a system parameter synthesizer to monitor local power system parameters which are local to a first point at which the braking resistor assembly is coupled with the power system, the synthesizer using the local power system parameters to synthesize remote power system parameters at a second point remote from the first point, and wherein the controller determines the conductance control signal in response to the synthesized remote power system parameters.

15. A dynamic braking apparatus for stabilizing a power system having a power system bus during power system disturbances, comprising:
a braking resistor assembly for coupling with said power system bus;
a controller to monitor a power system parameter to determine a frequency deviation signal of the monitored parameter indicative of a power system disturbance and to determine therefrom a thyristor control signal; and
a thyristor valve coupled with the braking resistor assembly, the thyristor valve responsive to the thyristor control signal to vary the amplitude of the conductance of the braking resistor assembly so as to brake and damp a power system disturbance.

16. A dynamic braking apparatus for stabilizing a power system having a power system bus and a generator coupled with the power system during power system disturbances, comprising:
   a braking resistor assembly for coupling with said power system bus;
   a controller to monitor a power system parameter indicative of a power system disturbance and to determine therefrom a thyristor control signal; and
   a thyristor valve coupled with the braking resistor assembly, the thyristor valve responsive to the thyristor control signal to vary the conductance of the braking resistor assembly so as to brake and damp a power system disturbance;
   wherein the power system parameter is one of the group comprising:
      a power flow on a first power system line at which the braking resistor assembly is coupled with the power system;
      a frequency on said first power system line;
      a magnitude of a line current flowing through said first power system line; and
      a speed at which said generator is running.

17. A dynamic braking apparatus for stabilizing a power system having a power system bus during power system disturbances, comprising:
   a braking resistor assembly for coupling with said power system bus;
   a controller to monitor a power system parameter indicative of a power system disturbance, wherein the controller includes:
      a modulator for establishing a modulation signal to modulate the conductance of the braking resistor assembly in response to the monitored power system parameter;
      a biasing stage for biasing the modulation signal, the biasing stage having a first deadband filter; and
      a limiter for limiting the biased modulation signal to provide the thyristor control signal, the limiter having a second deadband filter, with the first and second filters providing a thyristor control signal for substantially zero conductance of the braking resistor assembly during minor steady-state system disturbances; and
   a thyristor valve coupled with the braking resistor assembly, the thyristor valve responsive to the thyristor control signal to vary the conductance of the braking resistor assembly so as to brake and damp a power system disturbance.

18. A dynamic braking apparatus for stabilizing a power system having a power system bus during power system disturbances, comprising:
   a braking resistor assembly for coupling with said power system bus;
   a controller to monitor a power system parameter indicative of a power system disturbance, wherein the controller includes a system parameter synthesizer to monitor local power system parameters which are local to a first point at which the braking resistor assembly is coupled with the power system, the synthesizer using the local power system parameters to synthesize remote power system parameters at a second point remote from the first point, and wherein the controller determines the thyristor control signal in response to the synthesized remote power system parameters; and
   a thyristor valve coupled with the braking resistor assembly, the thyristor valve response to the thyristor control signal to vary the conductance of the braking resistor assembly so as to brake and damp a power system disturbance.

19. A dynamic braking apparatus for stabilizing a power system having a power system bus during power system disturbances, comprising:
   a braking resistor assembly for coupling with said power system bus;
   a controller to monitor a power system parameter indicative of a power system disturbance, wherein the controller determines the conductance control signal from the power system parameter using a linear transfer function, a peak detecting function and a limiting function, with the linear transfer function determining a modulation signal from the power system parameter, the peak detecting function providing a bias to the modulation signal, and the limiting function limiting the biased modulation signal to a value between a maximum conductance and a lower deadband limit to provide the thyristor control signal; and
   a thyristor valve coupled with the braking resistor assembly, the thyristor valve responsive to the thyristor control signal to vary the conductance of the braking resistor assembly so as to brake and damp a power system disturbance.

20. A method of damping subsequent oscillations on a power system following a power system disturbance, the method comprising the steps of:
   providing a variable conductance braking resistor assembly coupled with said power system, the conductance of the braking resistor assembly being variable in response to a conductance control signal;
   monitoring a power system parameter indicative of a power system disturbance to detect an occurrence of a power system disturbance;
   determining a frequency deviation signal of the monitored power system parameter;
   determining the conductance control signal in response to the frequency deviation signal to dampen the subsequent power system oscillations following the detection of the occurrence of a power system disturbance; and
   varying the amplitude of the conductance of the braking resistor assembly with the conductance control signal to dampen the subsequent power system oscillations.

21. A method of damping subsequent oscillations on a power system following a power system disturbance, the method comprising the steps of:
   providing a variable conductance braking resistor assembly coupled with said power system, the conductance of the braking resistor assembly being variable in response to a conductance control signal;
   monitoring a power system parameter indicative of a power system disturbance to detect an occurrence of a power system disturbance;
   determining the conductance control signal in response to the monitored power system parameter so as to dampen the subsequent power system oscillations following the detection of the occurrence of a power system disturbance by:

establishing a modulation signal to modulate the conductance of the braking resistor assembly in response to the monitored power system parameter;

biasing the modulation signal; and limiting the biased modulation signal under a maximum conductance limit; and varying the conductance of the braking resistor assembly with the conductance control signal to dampen the subsequent power system oscillations.

22. A method of damping subsequent oscillations according to claim 21 wherein:

the biasing step comprises biasing the modulation signal in damping regions beyond a first deadband region so as to provide a conductance control signal for substantially zero conductance of the braking resistor assembly during minor steady-state system disturbances when the modulation signal falls within the first deadband region; and the limiting step comprises limiting the biased modulation signal in a conductance region between a second deadband region and the maximum conductance limit so as to provide a conductance control signal for substantially zero conductance of the braking resistor assembly during minor steady-state system disturbances when the biased modulation signal falls within the second deadband region.

23. A method of damping subsequent oscillations according to claim 21 wherein the biasing step comprises conditioning the modulation signal, then biasing the conditioned modulation signal with a first time constant when the modulation signal is rising, and biasing the conditioned modulation signal with a second time constant when the modulation signal is falling.

24. A method of damping subsequent oscillations according to claim 20 wherein the monitoring step comprises monitoring a power flow on a power system line at which the braking resistor assembly is coupled with the power system.

25. A method of damping subsequent oscillations on a power system following a power system disturbance, the method comprising the steps of:

providing a variable conductance braking resistor assembly coupled with said power system, the conductance of the braking resistor assembly being variable in response to a conductance control signal;

monitoring a frequency on a power system line at which the braking resistor assembly is coupled with the power system to detect an occurrence of a power system disturbance;

determining the conductance control signal in response to the monitored power system line frequency so as to dampen the subsequent power system oscillations following the detection of the occurrence of a power system disturbance; and varying the conductance of the braking resistor assembly with the conductance control signal to dampen the subsequent power system oscillations.

26. A method of damping subsequent oscillations on a power system following a power system disturbance, the method comprising the steps of:

providing a variable conductance braking resistor assembly coupled with said power system, the conductance of the braking resistor assembly being variable in response to a conductance control signal;

monitoring a magnitude of a line current flowing through a power system line at which the braking resistor assembly is coupled with the power system to detect an occurrence of a power system disturbance;

determining the conductance control signal in response to the monitored line current magnitude so as to dampen the subsequent power system oscillations following the detection of the occurrence of a power system disturbance; and varying the conductance of the braking resistor assembly with the conductance control signal to dampen the subsequent power system oscillations.

27. A method of damping subsequent oscillations on a power system having a generator coupled with the power system following a power system disturbance, the method comprising the steps of:

providing a variable conductance braking resistor assembly coupled with said power system, the conductance of the braking resistor assembly being variable in response to a conductance control signal;

monitoring a speed at which the generator is running to detect an occurrence of a power system disturbance;

determining the conductance control signal in response to the monitored generator speed so as to dampen the subsequent power system oscillations following the detection of the occurrence of a power system disturbance; and varying the conductance of the braking resistor assembly with the conductance control signal to dampen the subsequent power system oscillations.

28. A method of damping subsequent oscillations on a power system following a power system disturbance, the method comprising the steps of:

providing a variable conductance braking resistor assembly coupled with said power system, the conductance of the braking resistor assembly being variable in response to a conductance control signal;

monitoring a power system parameter indicative of a power system disturbance to detect an occurrence of a power system disturbance, wherein the monitoring step comprises:

monitoring the local power system parameters which are local to a first point at which the braking resistor assembly is coupled with the power system; and synthesizing remote power system parameters at a second point remote from the first point with the monitored local power system parameters to synthesize;

determining the conductance control signal in response to the synthesized remote power system parameters so as to dampen the subsequent power system oscillations following the detection of the occurrence of a power system disturbance.

29. A method of damping subsequent oscillations on a power system following a power system disturbance, the method comprising the steps of:

providing a variable conductance braking resistor assembly coupled with said power system, the conductance of the braking resistor assembly being variable in response to a conductance control signal;

monitoring a power system parameter indicative of a power system disturbance to detect an occurrence of a power system disturbance;
determining the conductance control signal in response to the monitored power system parameter so as to dampen the subsequent power system oscillations following the detection of the occurrence of a power system disturbance, wherein the determining step comprises:
determining a modulation signal from the power system parameter with a linear transfer function;
providing a bias to the modulation signal with a peak detection function; and
limiting the biased modulation signal to a value between a maximum conductance and a lower deadband limit with a limiting function, to provide the conductance control signal; and
varying the conductance of the braking resistor assembly with the conductance control signal to dampen the subsequent power system oscillations.

30. A method of damping subsequent oscillations according to claim 20 wherein:
the providing step comprises providing a variable conductance braking resistor assembly comprising a thyristor valve coupled with a resistor; and
the determining step comprises determining a conductance control signal comprising a thyristor control signal.

31. A method of stabilizing a power system during a power system disturbance, comprising the steps of:
monitoring a power system parameter indicative of a power system disturbance;
determining a frequency deviation signal of the monitored power system parameter;
generating a conductance control signal in response to the determined frequency deviation signal; and
applying the conductance control signal to a braking resistor coupled to a first power system line to vary the amplitude of the braking resistor conductance and thereby dampen the power system disturbance.

32. A method of stabilizing a power system having a generator coupled therewith during a power system disturbance, comprising the steps of:
monitoring a power system parameter indicative of a power system disturbance by monitoring a power system parameter selected from the group comprising:
a power flow through the first power system line;
a frequency on the first power system line;
a magnitude of a line current flowing through the first power system line; and
a speed at which said generator is running;
generating in response to the monitoring a conductance control signal; and
applying the conductance control signal to a braking resistor coupled to a first power system line to vary the braking resistor conductance and thereby dampen the power system disturbance.

33. A method of stabilizing a power system during a power system disturbance, comprising the steps of:
monitoring a power system parameter indicative of a power system disturbance;
generating in response to the monitoring a conductance control signal, wherein the generating step includes the steps of:
modulating the braking resistor in response to the monitored power system parameter to provide a modulation signal;
biasing the modulation signal to provide a biased modulation signal; and
limiting the biased modulation signal to provide the conductance control signal; and
applying the conductance control signal to a braking resistor coupled to a first power system line to vary the braking resistor conductance and thereby dampen the power system disturbance.

34. An apparatus for stabilizing a power system during a power system disturbance, comprising:
a monitor for monitoring a power system parameter indicative of a power system disturbance;
a controller responsive to the monitor for determining a frequency deviation signal of the monitored parameter and generating in response thereto a conductance control signal; and
a variable conductance braking impedance coupled to the power system, the amplitude of the conductance of the braking impedance responsive to the conductance control signal for damping the power system disturbance.

35. An apparatus for stabilizing a power system according to claim 34 wherein the variable conductance braking impedance includes:
a braking resistor;
a thyristor valve coupled with the braking resistor, the thyristor valve varying the conductance of the braking resistor by controlling the current flowing therethrough in response to the conductance control signal; and
an inductive component coupled with the braking resistor to slow a rate of rise of a current waveform through the thyristor valve.

* * * * *